US012423148B2

(12) United States Patent
Moraru et al.

(10) Patent No.: US 12,423,148 B2
(45) Date of Patent: Sep. 23, 2025

(54) ROBOTIC PROCESS AUTOMATION ORGANIZATION

(71) Applicant: International Business Machines Corporation, Armonk, NY (US)

(72) Inventors: Costel Moraru, Augsburg (DE); Erik Rueger, Ockenheim (DE); Oriette Mohamed Nayel Mahmoud, Sheikh Zayed (EG); Filis Omer, Constanta (RO); Laurentiu Gabriel Ghergu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 18/296,761

(22) Filed: Apr. 6, 2023

(65) Prior Publication Data
US 2024/0264869 A1 Aug. 8, 2024

Related U.S. Application Data

(60) Provisional application No. 63/482,908, filed on Feb. 2, 2023.

(51) Int. Cl.
G06F 12/00 (2006.01)
G06F 9/50 (2006.01)

(52) U.S. Cl.
CPC .................. *G06F 9/5027* (2013.01)

(58) Field of Classification Search
CPC ........ G06F 8/70; G06F 12/0246; G06F 9/445; G06F 12/0868; G06F 2212/1016;
(Continued)

(56) References Cited

U.S. PATENT DOCUMENTS 10,324,457 B2 6/2019 Neelakandan
2018/0337985 A1* 11/2018 Nishikawa .......... H04L 65/1083
(Continued)

FOREIGN PATENT DOCUMENTS

CN 110909962 A 3/2020
CN 113064706 A 7/2021
(Continued)

OTHER PUBLICATIONS

Anonymous "System and Method for Self-organizing Robotic Networks," Feb. 4, 20022, https://priorart.ip.com/IPCOM/000268542.
(Continued)

*Primary Examiner* — Mardochee Chery
(74) *Attorney, Agent, or Firm* — Anthony Curro

(57) ABSTRACT

A computer implemented method, computer readable storage medium, and computer system of operating a robotic process automation organization network comprising multiple software robots. The method includes receiving a task by a main robot via the network. The main robot is one of the multiple software robots. The task comprises a code package. The method also includes broadcasting a multicast request for services by the main robot to multiple software robots. Each robot is implemented as a computer program on individual computer systems of multiple computer systems via the network. The method further includes receiving a response by at least a portion of the multiple software robots via the network and selecting at least one worker robot from the multiple robots by the main robot and distributing at least a portion of the code package to the at least one worker robot by the main robot.

20 Claims, 6 Drawing Sheets

(58) Field of Classification Search
CPC .... G06F 3/0659; G06F 8/65; G06F 2212/214; G06F 2212/261; G06F 2212/312; G06F 2212/463; G06F 2212/466; G06F 2212/7201; G06F 2212/7208
USPC .......................................................... 718/104
See application file for complete search history.

(56) References Cited

U.S. PATENT DOCUMENTS

2021/0133669 A1   5/2021   Cella
2022/0258334 A1   8/2022   Krishnamoorthy

FOREIGN PATENT DOCUMENTS

CN   113093732 B   *   2/2023   ........... G05D 1/0285
JP   2022532890 A       7/2022

OTHER PUBLICATIONS

Anonymous, "Intelligent Robotics Process Automation," Sep. 3, 2018, 5pgs, https://priorart.ip.com/IPCOM/000255127.
Osmundsen, Karen & Iden, Jon & Bygstad, Bendik. (2019). Organizing Robotic Process Automation: Balancing Loose and Tight Coupling. 10.24251/HICSS.2019.829.

* cited by examiner

ROBOTIC PROCESS AUTOMATION ORGANIZATION

BACKGROUND

The present disclosure relates to robotic process automation.

In Robotic Process Automation (RPA), processes which would normally be performed by a human are automated using software robots (bots) that are typically installed on virtual machines. Current RPA platforms are typically implemented using either disconnected software robots for simple use cases, or using groups of robots which are coordinated centrally by an orchestrator component.

SUMMARY

In one aspect the disclosure provides for a computer-implemented method of operating a robotic process automation organization network that comprises multiple software robots. The method comprises receiving a task by a main robot via the network. The main robot is one of the multiple software robots. The task comprises a code package comprising instructions for execution by the main robot. The method also comprises broadcasting a multicast request for services by the main robot to multiple software robots that each are implemented as a computer program on individual computer systems via the network. The method further comprises in response to the broadcasting receiving a response by at least a portion of the multiple software robots via the network. The method also comprises selecting at least one worker robot from at least a portion of the multiple robots by the main robot. The method further comprises distributing at least a portion of the code package to the at least one worker robot by the main robot via the network for execution of the at least one portion of the code package by the at least one worker robot. The claimed computer-implemented method allows robots to self-organize in a RPA environment without an orchestrator and human operator.

According to a further aspect of the present disclosure, a computer readable storage medium is provided. The computer readable storage medium includes computer executable instructions that when executed by at least one computing device operate a robotic process automation organization network comprising multiple software robots. The computer readable storage medium comprises instructions to receive a task by a main robot via the network. The main robot is one of the multiple software robots, and the task comprises a code package comprising instructions for execution by the main robot. The computer readable storage medium also includes instructions to broadcast a multicast request for services by the main robot to multiple software robots. Each robot is implemented as a computer program on individual computer systems of multiple computer systems via the network. The computer readable storage medium further includes instructions to, in response to the broadcasting, receive a response by at least a portion of the multiple software robots via the network. The computer readable storage medium also includes instructions to select at least one worker robot from the at least a portion of the multiple robots by the main robot. The computer readable storage medium further includes instructions to distribute at least a portion of the code package to the at least one worker robot by the main robot via the network for execution of the at least a portion of the code package by the at least one worker robot. The claimed computer readable storage medium allows robots to self-organize in a RPA environment without an orchestrator and human operator.

According to yet a further aspect of the present disclosure, a computer system for operating a robotic process automation organization network that comprises multiple software robots is presented. The computer system comprises a processor configured for controlling the computer system. The computer system further comprises a memory storing machine-executable instructions and software robot executable instructions. Execution of the instructions causes the processor to receive a task by a main robot via the network. The main robot is one of the multiple software robots and the task comprises a code package comprising instructions for execution by the main robot. Execution of the instructions also causes the processor to broadcast a multicast request for services by the main robot to multiple software robots. Each robot is implemented as a computer program on individual computer systems of multiple computer systems via the network. Execution of the instructions further causes the processor to, in response to the broadcasting, receive a response by at least a portion of the multiple software robots via the network. Execution of the instructions also causes the processor to select at least one worker robot from the at least a portion of the multiple robots by the main robot. Execution of the instructions further causes the processor to distribute at least a portion of the code package to the at least one worker robot by the main robot via the network for execution of the at least a portion of the code package by the at least one worker robot. The claimed computer system allows robots to self-organize in a RPA environment without an orchestrator and human operator.

BRIEF DESCRIPTION OF THE DRAWINGS

In the following embodiments of the disclosure are explained in greater detail, by way of example only, making reference to the drawings in which.

DETAILED DESCRIPTION

Figure 1:
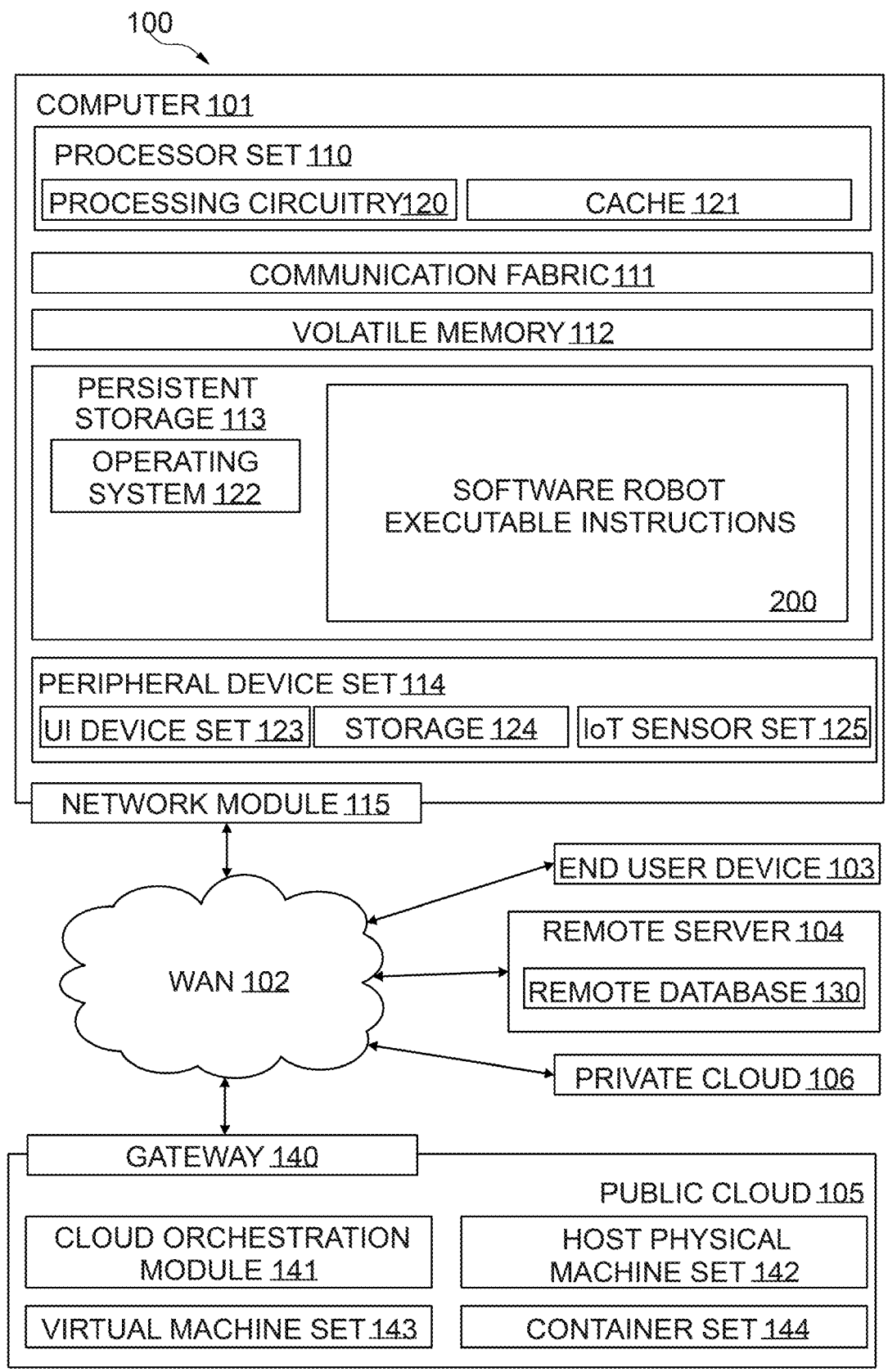
FIG. 1 illustrates an example of a computing environment, according to one or more embodiments of the present disclosure.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In at least some known computing systems, Robotic Process Automation (RPA) executes processes which would normally be performed by a human, where such processes are automated using software robots (bots) that are typically installed on virtual machines. In many of these known RPA systems, the software robots are programmed using platform dependent programming languages. At least some sectors of the process automation industry use one or more of multiple RPA platforms, where one portion of the RPA platforms uses disconnected robots for simple uses cases, and another portion of the RPA platforms use robots that are coordinated through an orchestrator component. For Many of these known orchestrators are typically expensive components that facilitate the coordination of all robots in a company from a central location. In addition, the orchestrators typically require specialized expertise to administer. Examples of specific features of an orchestrator component include queue management for distributing the workload between multiple robots, and scheduling when a particular robot should start working. In the instances where there are multiple RPA environments, the user will need to purchase multiple orchestrator components, or otherwise, the robots across the spectrum of tasks will not be able to be coordinated. For another example, for those RPA environments that implement high availability and implement disaster recovery scenarios, multiple orchestrators and databases (used by orchestrator) need to be purchased to ensure that the RPA platform survives datacenter failures. This can make the overall solution extremely expensive for active disaster recovery with high availability features. Accordingly, for large enterprise organizations, the costs associated with such narrowly purposed orchestrator components can be quite large.

Also, in some known RPA environments, technical hurdles to full integration of the robots and the orchestrators are presented. For example, in some such known RPA environments that are resident within highly regulated network and multi-network environments, the respective robots will attempt to register with one of the orchestral components which may be difficult to achieve is the aforementioned environments where the orchestrators are placed in one network and the robots in another network. Moreover, for those configurations where the robots are controlled through an orchestrator, the orchestrator is a single-point-of-failure.

Furthermore, in some known RPA environments, though using an orchestrator, robots can be started via timed schedules (i.e., cron jobs) or by the use of queues. In both options, the scalability is highly limited as there can be multiple robots which have free time but are not yet allocated to a piece of work. For example, if a queue was configured to be consumed by 3 robots, the administrator needs to manually add a $4^{th}$ robot to scale the queue and the respective 4 robots, where all four robots must be fully dedicated to the queue. In addition, there is no possibility for a robot to dynamically change focus, for example, working on the assigned queue for 20 minutes, then disconnecting from that queue and working on an independent task.

Accordingly, currently, there is no RPA industry platform or network which allows robots to self-organize without an orchestrator, and where such platform requires little to no administration efforts to maintain the RPA environment.

In some known RPA platforms, for example, that platform described in CN110909962A, an RPA robot sharing center executes an automatic approval method for accelerating an approval speed to complete a business process. Specifically, a user sends an automatic approval request to the robot sharing center through an automatic process function module of the RPA robot sharing center. The robot sharing center accepts a user automation request and judges when the automation request is assigned to one or more robots based on the characteristics of the request. The robot sharing center assigns the automation request to one or more RPA robots based on the relation among the automation task flow through transmitting the respective RPA robot script to the RPA robots. Each RPA robot completes the examination and approval operation according to the latest acquired robot script. The robot sharing center feeds back the task condition processed by the RPA robots to the user.

In other known RPA platforms, as described in U.S. Pat. No. 10,324,457B2, a robotic process automation (RPA) method for supply chain management (SCM) operations is provided to facilitate faster processing times, a reduction in errors, and a verification means for accurate results. The method includes receiving at least one SCM scenario from a user through an electronic user interface. The SCM scenarios are stored in a SCM scenario database and a sub network is created having at least one server based on the received scenario. At least one relevant fixture (e.g., script) is identified based on the received scenario, and the SCM scenario specific data is embedded on the identified fixture to generate an xml file. The xml file is sent to an execution engine for executing the scenario on an application, and an appropriate data object/dome is identified in the application for processing the received SCM scenario, and a result is communicated for enabling identification of, and selection of, an artificial intelligence based dynamic processing logic using a bot to process the SCM operations.

Additional methods for configuring RPA platforms are described in IPCOM000255127D, i.e., implementing a platform to facilitate process automation with self-learning capability to determine possible situations in an environment which will cause a problem to occur. In addition, the actions required to prevent or mitigate such conditions are determined with a self-learning formula which has a continued learning capability, as well as a determination of a pattern, identification of a possible change in a production environment before it happens, and allowing a detrimental change of situation to be mitigated or prevented through process automation.

The embodiments as disclosed and described herein are configured to provide an improvement to the technological field associated with RPA environments, and, more specifically, toward allowing robots to self-organize in a RPA environment without an orchestrator and human operator. Therefore, the embodiments described herein facilitate the aforementioned integration into a practical application of a computer system, computer readable storage medium, and computer-implemented method for allowing robots to facilitate the elimination of the need for orchestrators and human administration, where the robots are self-organizing. As such, those computer systems with embedded RPA environments are configured to operate more efficiently and cheaply, thereby providing an improvement to computer technology.

An advantage of the system described and claimed herein is that the worker robots are self-organizing and it eliminates the need for an orchestrator component. This eliminates the need to perform complex maintenance and setup of the multiple software robots. Additionally, it is easier to add additional software robots when there is an emergency situation or there is a peak or increase in requests.

In another embodiment, the robotic process automation organization network comprises: multiple computer systems, wherein each of the multiple computer systems has access to a processor and a memory, wherein the multiple computer systems are connected via a network; and multiple software robots each implemented as a computer program on individual computer systems of the multiple computer systems.

In another embodiment, the code package comprises parallel execution instructions. The selection of the at least one worker robot is a selection of the multiple of the worker robots. The method further comprises distributing the code package to execute the parallel execution instructions to more than one of the multiple worker robots by the main robot via the network. The method further comprises receiving computer results from the more than one of the multiple worker robots by the main robot via the network in response to distributing the code package. The method further comprises merging the computer results of the one or more multiple worker robots by the main robot to complete execution of the parallel execution instructions. This is beneficial because it provides a means of parallelizing tasks by the multiple software robots. This enables the multiple software robots to complete tasks much more rapidly and efficiently than if the code package did not contain parallel execution instructions.

In another embodiment, each of the multiple software robots has at least one preprogrammed role to perform within the robotic process automation organization network. For example, various requests which can be broadcast via the multicast request may have requests for particular types of services or roles to be performed. This is beneficial because it assists in providing for a self-organizing group of multiple software robots.

In another embodiment, the at least one preprogrammed role comprises a package distribution role. The package distribution role may be responsible for ensuring that the package or the client's work such as the code package is distributed to the self-organizing network of software robots. In some embodiments, the package distribution role is responsible for the completion of a particular action or request and can utilize long-term persistence to achieve it. For example, in some embodiments, the particular software robot maintains a package distribution role until the task is completed.

In another embodiment, the at least one preprogrammed role comprises a package execution role. For the package execution role, the bot or software robot that is assigned to this role is responsible for ensuring that the execution is completely based on the availability inside of the network. In some embodiments, this includes assigning a particular bot or software robot to be the queue holder, and if necessary, a backup queue holder.

In another embodiment, the at least one preprogrammed role comprises a queue holder role. The queue holder role is responsible for keeping the workload split into a queue to pass along to available bots or software robots for processing work. In some embodiments, it uses long-term persistence to ensure the ability to recover from the crash of a bot or software robot.

In another embodiment the at least one preprogrammed role comprises a queue backup holder. The queue backup holder may perform, in the case of high availability in the networks, a need for additional bots or software robots to hold the workload queue in case the primary queue holder will not be able to come back online. In some embodiments, This, for example, provides a backup if there is a regional disaster or other data center crash. For example, a fire or earthquake in a particular data center may result in the original queue holder being down and not being able to come back online.

In another embodiment, the at least one preprogrammed role comprises a worker role. In some embodiments, the worker role is a bot or software robot that performs tasks assigned to it.

In another embodiment, the method comprises adding an additional robot to the multiple software robots by connecting an additional computer system to the network. Adding an additional robot to the multiple software robots further comprises instantiating the additional robot on the additional computer system. Adding the additional robot to the multiple software robots further comprises joining the additional robot to the multiple software robots by having the additional robot monitor the network for the multicast request. In some embodiments. this provides an efficient means of adding additional bots or software robots to the multiple software robots. This method has the advantage of not needing to configure an orchestrator component to add the additional software robot. In some embodiments, this step therefore is performed in an automated or on-demand fashion.

In another embodiment, the code package comprises a quality of service specification. The method further comprises determining a quality of service metric before or during distribution of the at least a portion of the code package or during execution of the at least a portion of the code package. The method further comprises triggering the addition of additional robots to the multiple software robots if the quality of service metric does not meet the quality of service specification. The quality of service metric could, for example, be such things as a response time or in the progress in completing a particular task. In some embodiments, the quality of service metric is, for example, determined by different members of the multiple software robots. In the case where the quality of service metric is determined before or during the distribution of the code package of the at least one worker robot, this is, for example, performed by the main robot.

During the execution of at least a portion of the code package, in some embodiments, it is performed by the main robot; but, in some embodiments, it is also performed by the at least one worker robot working on a particular portion of the code package. For example, in some embodiments, if the at least one worker working on the portion of the code package is unable or does not complete a task within a certain period of time, it will automatically cause the system to spawn more bots or software robots.

In another embodiment the multiple software robots comprise a robot-specific geographic location identifier. The method further comprises receiving a site failure warning via the network. The site failure warning comprises a site geographic location identifier. The method further comprises triggering the addition of the additional robot to the multiple software robots if the site geographic location identifier matches the robot-specific geographic location identifier of a selected robot from the multiple software robots. This could occur in a variety of situations. In some embodiments, there is an additional robot or system which is tasked for monitoring the entire group of multiple software robots. In this case, if the site geographic location identifier matches one or more robot-specific geographic location identifiers, then this will trigger the addition of the additional robot by the robot that has been tasked to do this or the additional system. In other cases, the main robot will track the robot-specific geographic location identifiers for robots that are working on the code package that it is distributing. If it detects that some of these robots have gone down or are lost due to the site failure, then this will cause the main robot to trigger the addition of the additional robot or robots to the multiple software robots.

In another embodiment, the multiple software robots comprise a robot-specific environment tag which identifies the multiple software robots as operating in either a production environment, a test environment, or a development environment. The method further comprises using the robot-specific environment tag to operate the multiple software robots within the production environment, the test environment, and the development environment as a shared pool of software robots. This will have the benefit that the robots may be reassigned from one type of environment to the other, for example between testing, production and development, based on the current needs of whatever projects or tasks are being performed by the multiple software robots. In some embodiments, the tag for the environment will be changed and thus the pool for testing increases with as many software robots that are necessary for that particular task.

In another embodiment the method further comprises estimating an execution time for the at least a portion of the code package by the at least one worker robot by inputting the at least one portion of code package into an execution time estimation module. The method further comprises scheduling additional monitoring of the network for further multicast requests by the at least one worker robot using the execution time. In some embodiments, the execution time estimation module will, for example, be implemented in different ways. In some embodiments, it will be implemented as a neural network which has been trained to perform this task. In some embodiments, it will be an expert system or lookup table. For example, if similar tasks have been performed in the past, the times required may be logged and this will be used for generating or determining the execution time.

In another embodiment, one of the multiple software robots is configured as a performance monitor. The method further comprises collecting performance data from the at least one portion of the multiple software robots during execution of the at least a portion of the code package by the performance monitor via the network. The method further comprises updating the execution time estimation module using the performance data. In this embodiment, as various tasks are performed by the robot, the performance monitor notes this and then this data is used to increase the accuracy of the execution time estimation module. As was mentioned before, this could be implemented in a variety of ways, either through artificial intelligence, statistical means, or as an expert or lookup table-based system.

In another embodiment, the multiple software robots are divided into multiple groups. Each of the multiple groups is configured to perform at least one task which is associated with this group of software robots. In this embodiment, the each of the multiple groups will be tasked with performing a particular task. This will, for example, be beneficial in situations where the tasks are performed in a parallel manner. It will also be beneficial in the case when there is need for redundancy to ensure that a task is performed even if there are for example failures or other complications in the network or the robotic process automation organization network.

In another embodiment, the multiple software robots are configured as a self-organizing system for automatically distributing and completing tasks comprising the code package. Some embodiments, for example, comprise a group of multiple software robots which receive a request via the network. One of these multiple software robots then assumes the role of the main robot which then distributes the portions of the code package to other worker robots which are chosen from the multiple software robots. This arrangement does, for example, not need an orchestrator component to function.

In another aspect, the disclosure provides for a computer system that comprises a processor configured for controlling the computer system. The computer system further comprises a memory storing machine-executable instructions and software robot executable instructions. Execution of the instructions causes the processor to instantiate a software robot by executing the software robot executable instructions. Execution of the machine-executable instructions further causes the processor to log the software robot onto the computer system by providing a user identification and a password. The software robot then has the credentials of a user using the computer system. This, for example, enables the software robot to perform tasks which would normally be performed by a human operator. Logging on in this fashion also eliminates the need to provide various permissions to the software robot as a software agent. The software robot is able to manipulate the computer system in the same way that a human would and use software and computing tools in the same way also.

Execution of the machine-executable instructions further causes the processor to join the software robot to the robotic process automation organization network by providing access to a network. The software robot is able to communicate via the network, and, in some embodiments, it receives the multicast request from the main robot. In some embodiments, it will also receive a request to perform a task and become the main robot itself.

Execution of the machine-executable instructions further causes the processor to receive a multicast request for services from a main robot of the robotic process automation organization network via the network by the software robot. Execution of the machine-executable instructions further causes the processor to send a response to the multicast request to the main robot via the network requesting to perform the services. Execution of the machine-executable instructions by the processor further causes the computational system to receive a portion of a code package from the main robot via the network. Execution of the machine-executable instructions by the processor further causes the system to execute the at least a portion of the code package by the software robot.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of one or more transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a block schematic diagram is presented illustrating an example of a computing environment for the execution of at least some of the computer code involved in performing the disclosed methods described herein, in accordance with some embodiments of the present disclosure.

Computing environment 100 contains an example of an environment for the execution of at least some of the computer code involved in performing the disclosed methods, such as software robot executable instructions 200 that provide executable code for implementing a software robot. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 121 and the other storage media discussed below. The program instructions, and associated data, are accessed by processor set 110 to control and direct performance of the disclosed methods. In computing environment 100, at least some of the instructions for performing the disclosed methods may be stored in block 200 in persistent storage 113

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the disclosed methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the disclosed methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
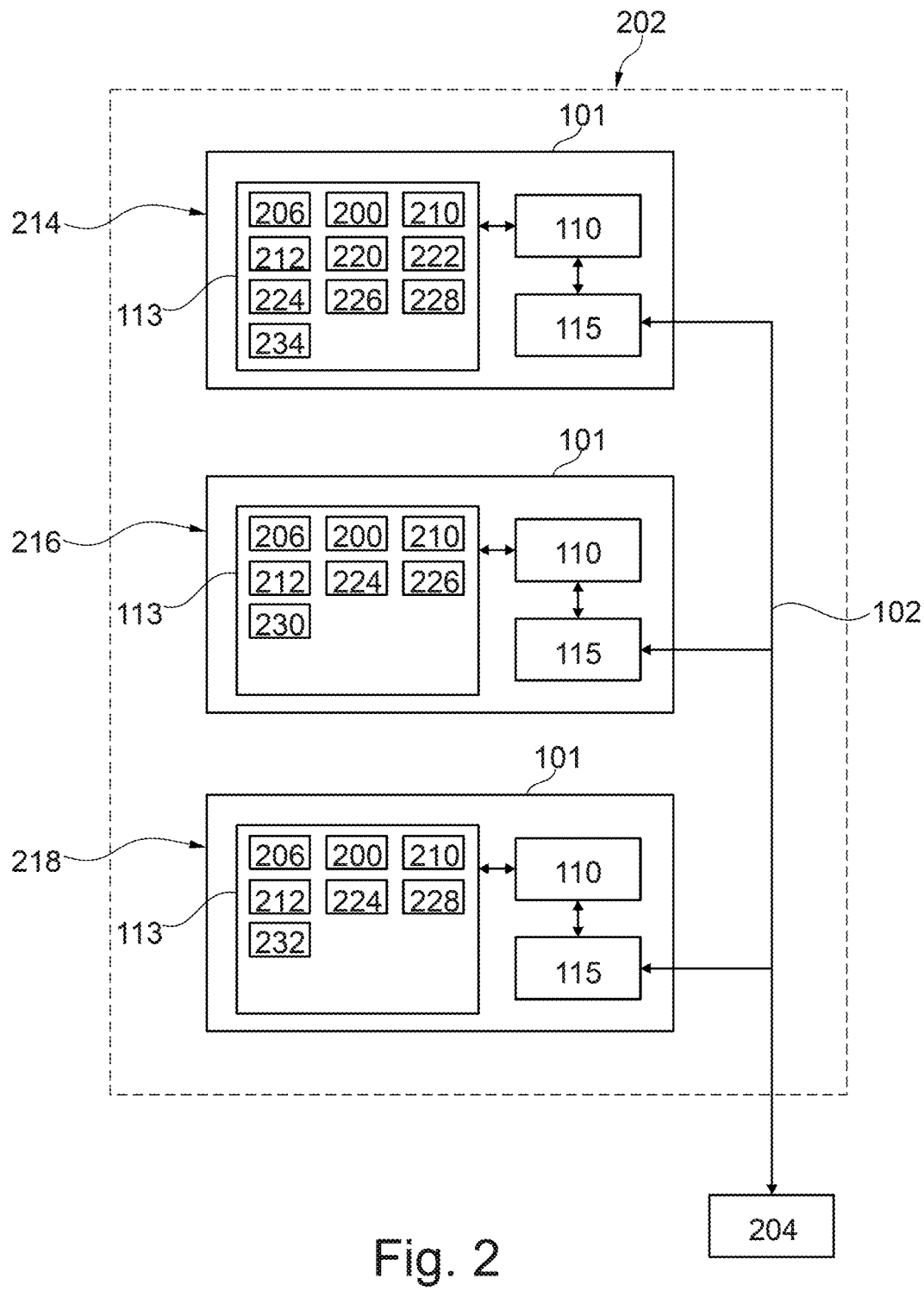
FIG. 2 shows a further view of the computing environment of FIG. 1, according to one or more embodiments of the present disclosure.

FIG. 2 shows a further view of the computing environment 100 that is used to form a robotic process automation network 202. This network 202 is implemented using multiple computers 101. Each of the computers 101 implements a software robot. The computer label 214 functions as the main robot in this example and the other two computers are labeled 216 and 218 and function as worker robots. Each computer 101 is an idealization of the computer 101 illustrated in FIG. 1. The processor set is shown as using the network module 115 to communicate via the wide area network 102. The wide area network 102 is further shown as being connected to an external system 204. The persistent storage 113 of each computer 101 is shown as storing machine-executable instructions 206.

The machine-executable instructions 206 provide instructions which enable the computers 101 to function as a portion of the robotic process automation network 202. The persistent storage 113 is further shown as containing the software robot executable instructions 200. These are used to instantiate the software robot on a particular machine 101. The persistent storage 113 is also shown as containing login credentials 210 which enable the software robot to login and use the computer 101 as well as optional robot-specific geographic location identifiers 212 that are, for example, used to identify the location of a particular robot 214, 216, 218 in the case of a failure of a data center.

The external system 204 is able to send a task 220 (a request for services) to the main robot 214. The task 220 comprises a code package 222. The memory 113 of the main robot 214 is shown as containing a multicast request for services 224 that is then broadcast using the wide area network 102 to the two worker robots 216 and 218. Worker robot 216 in response generates a response 226 which it then sends via the network to the main robot 214. Worker robot 218 generates response 228 and sends it via the wide area network 102 to the main robot 214. In response to receiving the two responses 226 and 228 the main robot 214 divides the code package 222 into a first code package portion 230 it sends to the first worker robot 216 and a second code portion 232 which it sends to the second worker robot 218. The first worker robot 216 then executes the first code portion 230. While this is happening the second robot 218 executes the second code portion 232.

The main robot 214 is also shown as containing an optional execution time estimation module 234 which may be used in the process of dividing the code package 222 into portions.

Figure 3:
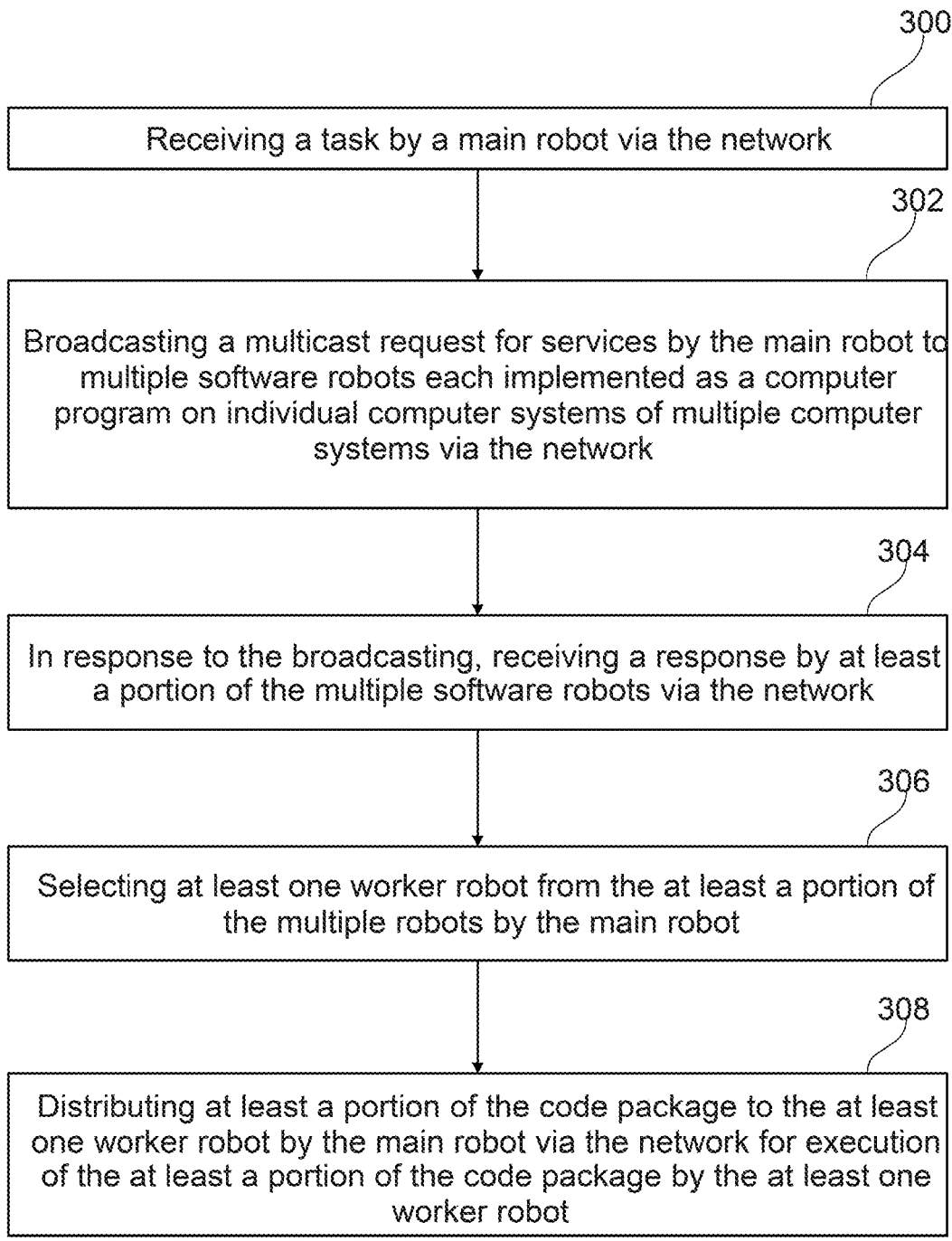
FIG. 3 shows a flow chart which illustrates a method of operating a computer within the computing environment of FIG. 1 or 2, according to one or more embodiments of the present disclosure.

FIG. 3 shows a flowchart which illustrates a method of operating the robotic process automation network 202. First, in step 300, the main robot 214 receives the task 220. Next, in step 302, the main robot 214 broadcasts the multicast request for services 224. Next, in step 304, the first worker robot 216 and the second worker robot 218 send responses 226, 228 to the main robot 214. Next, in step 306, the main robot 214 selects at least one worker robot 216, 218 from at least a portion of the multiple robots. Next, in step 308, the main robot 214 distributes the portions of the code package 230, 232 to the worker robots 218, 216. In a further step (shown in step 308) the worker robots 216, 218 execute their portions of the code package 230, 232.

The decentralized Robot Process Automation organization network is a system and method that offers a solution where robots act like a regular orchestrator with one or more of the following features:

a) Robot plug-and-play with horizontal scalability: where each robot joining the network will use a multicast SRN communication package to announce its availability for workload sharing and can accept a worker's offer. Robots will be able to appoint themselves as having different roles depending on the needs of the network.

b) New distributed code instructions: where programmers will define custom roles for the robots; hence offering novel features like designing and implementing robot communities, as compared to programming single robots.

c) Role promotions: Programmers can specify custom roles for robots which will allow them to program the interaction and responsibilities of each node in the network workload estimation based on code package. Roles could be package distribution, package execution, queue holder, queue backup holder, and worker.

d) Network scheduling priority: Robots use machine learning (ML) to estimate execution duration network nodes historical performance and can appoint themselves as performance monitors for code package execution estimations.

e) Disaster recovery feature where the network auto-allocates backup robots via Quality of Service (QoS) parameters, geo tags, and environment tags.

Examples may possibly have one or more of the following advantages:

1. Easily added as a feature of IBM Automation platform offering or WDG offering in maximum 3 months.
2. No administrator or specific installation, maintenance and configuration procedure needed. RPAs are plug and play.
3. The platform will self-organize and build itself.
4. No expensive orchestrator components (database, web application etc.) needed.
5. Disaster recovery and high availability built by default and no additional components needed to be purchased.
6. The robots will play roles appointed by the network itself.
7. Workload estimation done by RPAs.

Some potential features are described in more detail below:

a) Robot plug-and-play:

Once a robot is added to the network, it will start sniffing the traffic for specific SRN packages in order to be able to jump into the conversation using multicast communication.

As the developers upload a code package by connecting to any robot, that particular robot will announce it via a multicast SRN package that it requires specific services from other robots.

As a robot hears such request on the network, it will offer itself as a volunteer to execute the workload.

The robot with the code package can pre-select a specific worker's offer and pass along pieces of the code.

b) New distributed code instructions:

RPA programmers will be able to use delimiters to mark specific pieces of the RPA code which can be executed in parallel on random robots.

The results will be merged on a main robot once they are done.

Hence programmers will not just program a robot. They will design and implement robot communities.

c) Role promotions:

Programmers can specify custom roles for robots which will allow them to program the interaction and responsibilities of each node in the network.

For example, a robot can have a mailman role. This mimics the queue features in traditional RPA platforms.

d) Workload estimation based on code package:

A robot which receives a code package can use ML to estimate for each step how long it will take to execute given the historical performance of each network node.

A robot will appoint itself as the performance monitor and collect execution data from other robots.

This can be fed into a ML (or other solutions depending on embodiments) for code package execution estimations. These estimations are useful for anticipating if a robot has enough idle time between two cron executions to take additional responsibility from the network.

e) Horizontal scalability:

Because the network is designed for workload sharing, by simply adding a new robot, it can guarantee horizontal scalability, high availability and disaster recovery.

f) Disaster recovery features:

A specific code package can be specified a QoS parameter and the network will auto-allocate backup robots for the main robots that do the work.

Each robot can have a geo tag, which allows the network to survive earthquakes.

Each robot will have an environment tag (prod, dev, test) which allows the network to combine all environments under a shared pool of robots.

Figure 4:
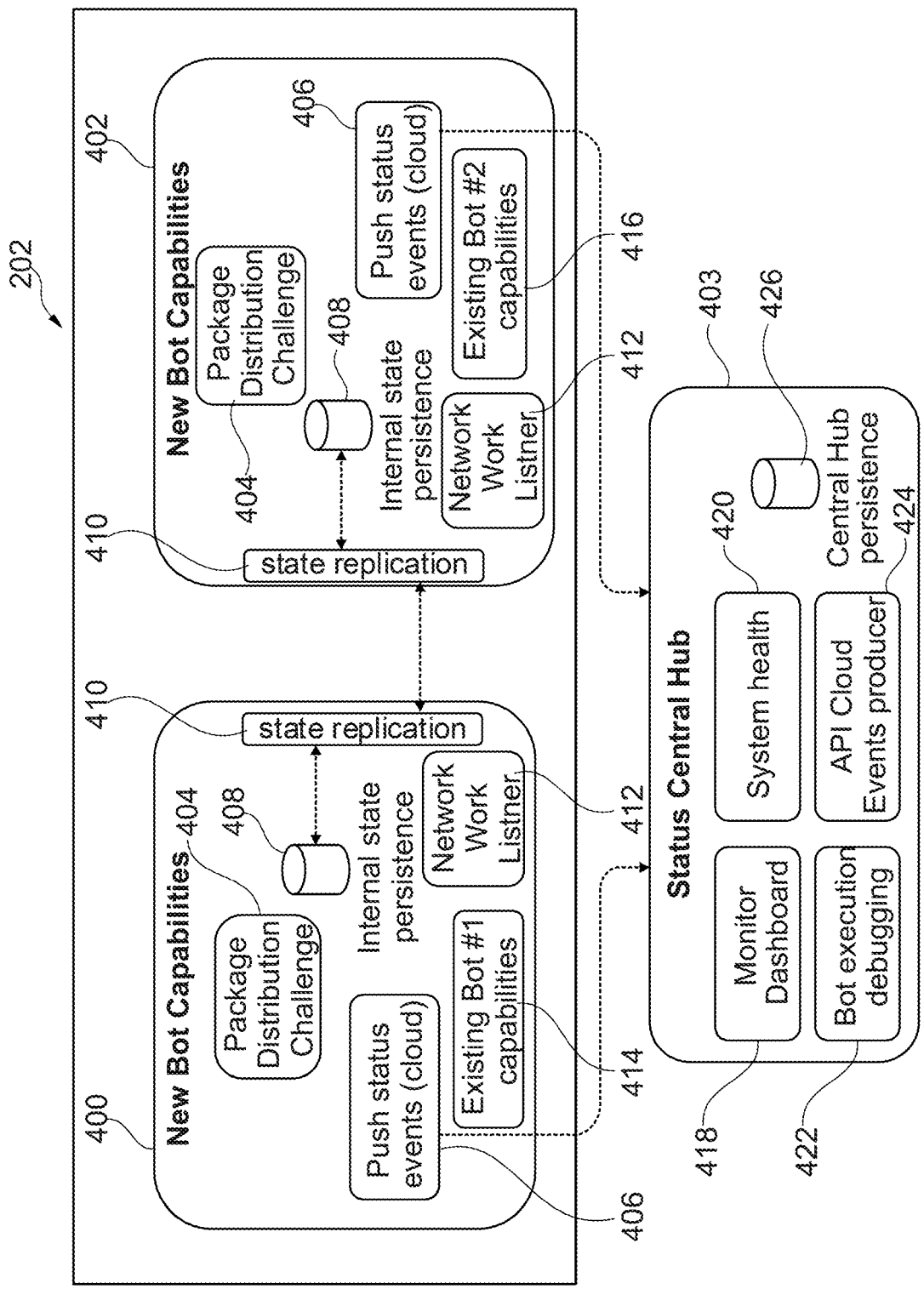
FIG. 4 illustrates a functional diagram of a robotic process automation network, according to one or more embodiments of the present disclosure.

FIG. 4 illustrates a functional diagram of the robotic process automation network 202 (also shown in FIG. 2). In this example the robotic process automation network 202 comprises a first software robot 400 and a second software robot 402. It is also shown as optionally containing a status central hub 403. Each of the software robots 400, 402 are shown as comprising a package distribution challenge 404, the capacity for push status events for the cloud 406, a storage of the internal state persistence 408, a mechanism for state replication between robots 410, and a network listener functionality 412. The first software robot 400 comprises its own existing bot number 1 capabilities 414 and software robot 402 comprises its own existing bot number 2 24 capabilities 416. The optional status central hub 403 could be an external system which monitors the activity of the robotic process automation network 202; however, these optional functions may also be incorporated into various software robots. The status central hub may for example contain a monitor dashboard 418, a system health monitor 420, a bot execution debugging system 422, and an API cloud events producer 424. There may also be a central hub storage which provides for persistence of the system.

Figure 5:
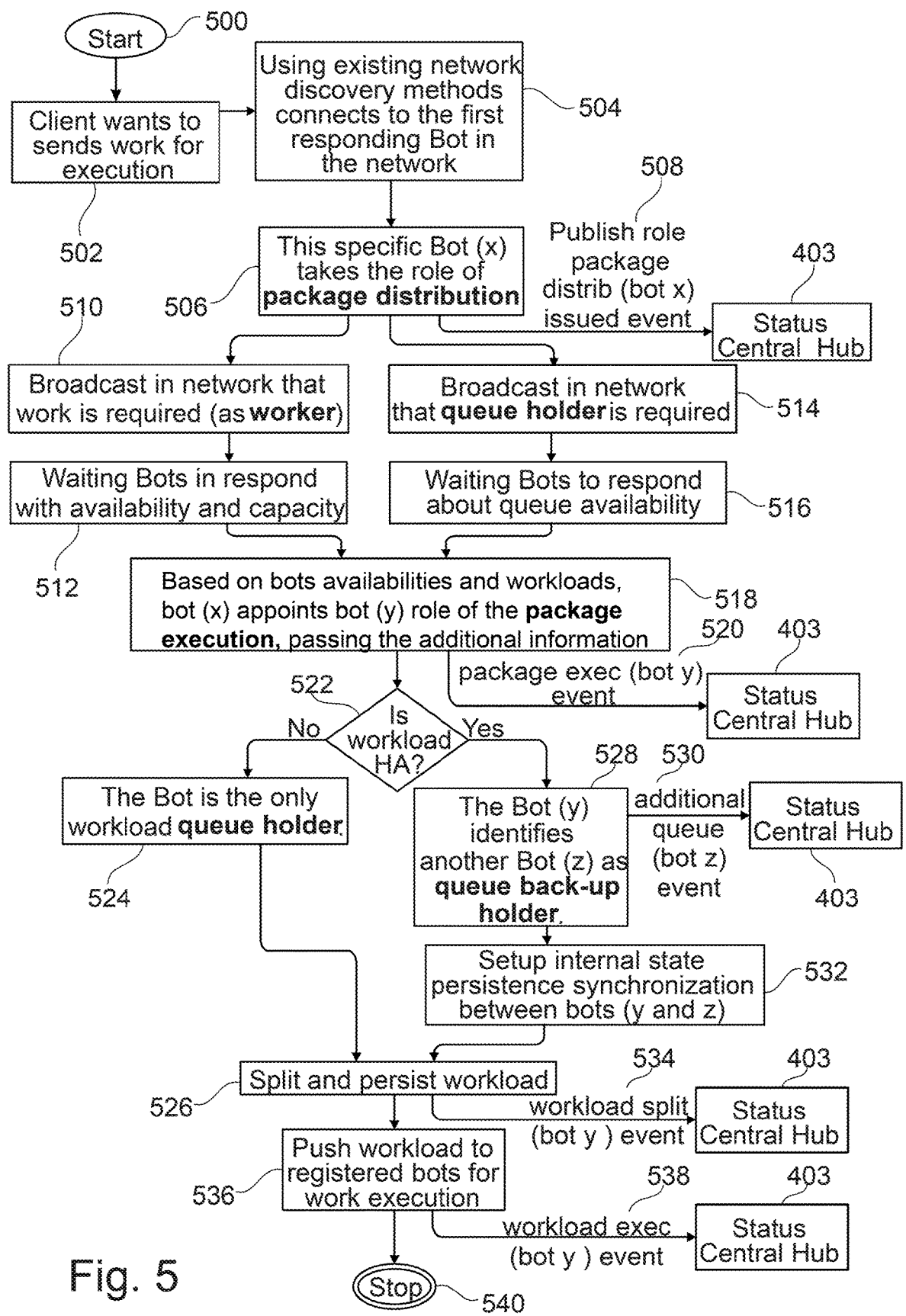
FIG. 5 illustrates a process diagram which explains how the robotic process automation organization network 202 functions when a new workload is received for execution, according to one or more embodiments of the present disclosure.

FIG. 5 illustrates a process diagram which explains how the robotic process automation organization network 202 functions when a new workload is received for execution. The method is shown as starting in step 500. Next, in step 502, and also referring to FIG. 2, the client wants to send work for execution by the system 202. Next, in step 504, using existing network discovery methods it connects to the first responsible bot in the network 202. Next, in step 506, the main robot 214 takes the role of package distribution. It optionally, in step 508, publishes the role package distribution to the status central hub 403. After step 506 several other actions occur. In step 510 there is a broadcast on the network that work is required 510. In step 512 there is a waiting period to wait while bots respond with availability and capacity. Concurrently to this, in step 514, there is a broadcast on the network that a queue holder is required. In step 516 there is a waiting period for waiting for a response from bots about queue availability. Steps 512 and 516 combine and then step 518 is performed. In step 518, based on bots' availability and workloads, bots X or the main bot appoints worker bot the role of packing execution passing on the additional information or code portions. This may be optionally reported in step 520 to the status central hub 403 (also shown in FIG. 4). After executing step 518, step 522 is a decision box that determines if the workload HA.

If the answer to the decision is "no," the method proceeds to step 524 and if the answer is "yes," the method proceeds to step 528. In step 524 the bot is the only workload queue holder. The method then proceeds to step 526 (discussed below). In step 528 the bot Y identifies another bot, Z, as a queue holder backup. This is optionally reported in step 530 to the central status hub 403. After step 528, step 532 is performed. In step 532 the setup internal state persistence is synchronized between bots Y and Z. Steps 524 and 532 then recombine in step 526. In step 526 splitting the workload and persisting is performed. The workload split may be optionally reported in step 534 to the status central hub 403. After step 526 is performed, step 536 is performed. In step 536 the workload is pushed to register bots for work execution. This may be optionally reported to the status central hub 403 in step 538. After step 536 is performed, the method ends in step 540.

Various roles may be fulfilled by software robots participating in method illustrated in FIG. 5:

package distribution (see step 504), responsible for ensuring that the package (the client's work that is to be processed) is distributed to the self-organizing network. It is responsible for the completion of this action and can utilize long term persistence to achieve it.

package execution (see step 518), the bot that is assigned this role is responsible with ensuring that the execution is completed based on the availability inside the network, making sure it assigns the queue holder and if necessary, the queue backup holder.

queue holder (see step 518), responsible for keeping the workload split into a queue to pass along to available bots for processing work. It will utilize long term persistence to ensure bot crash recovery.

queue back-up holder (see step 528), in case of high availability the networks need additional bots to hold the workload queue in case the primary one will not be able to come back online (due to regional disasters, data center crashes, etc.)

worker (see step 536), the role that a bot receives when executing the work unit.

It is noted that in some implantations any bot can hold multiple roles at the same time during the workload execution except queue holder and queue backup holder.

Figure 6:
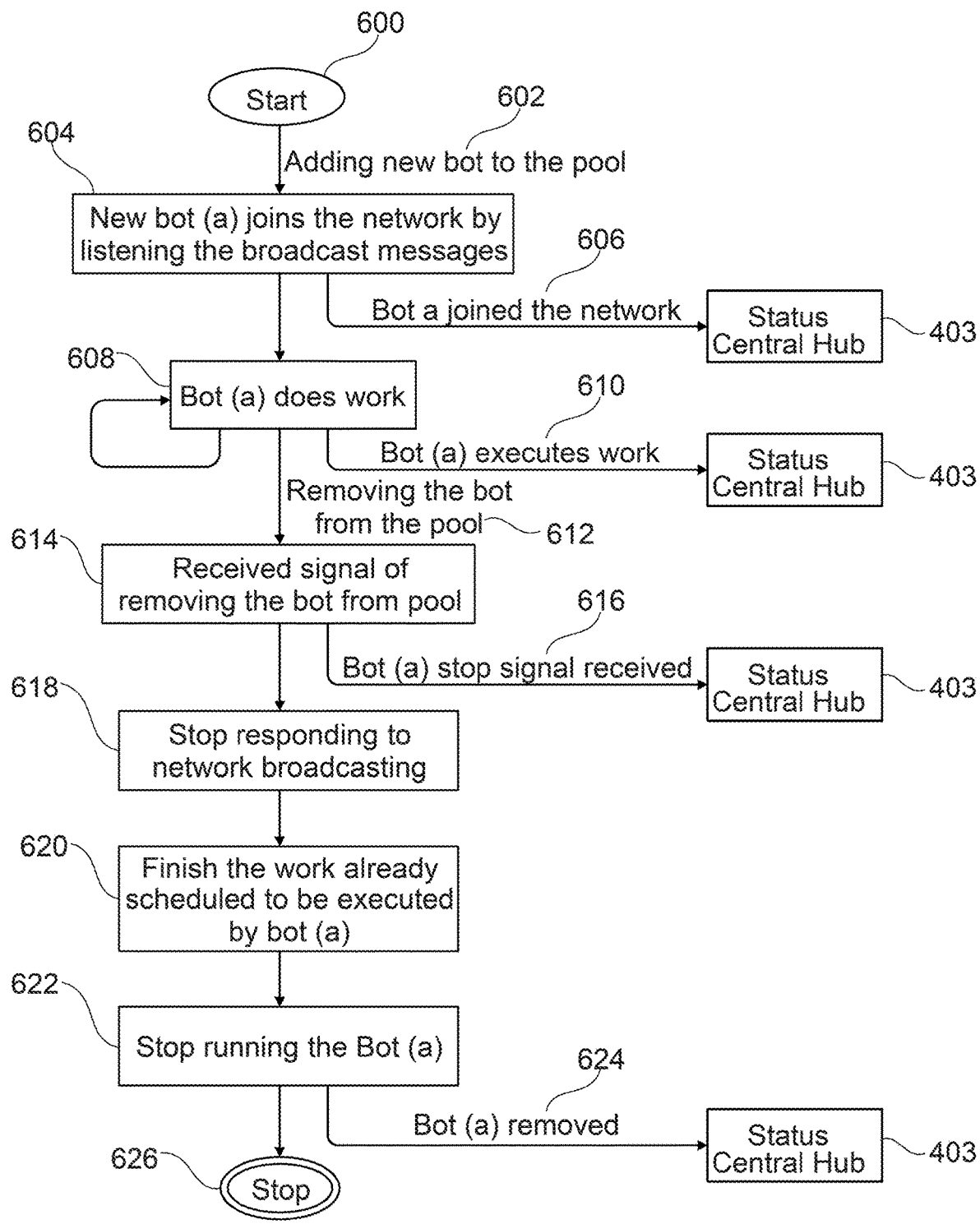
FIG. 6 illustrates how a software robot may join and exit the robotic process automation organization network 202, according to one or more embodiments of the present disclosure.

FIG. 6 illustrates how a software robot may join and exit the robotic process automation organization network 202 (shown in FIG. 2). First, in step 600, the method starts. Next, in step 602, a new software robot is added to the pool or the multiple software robots. Next, in step 604, new bot (a) joins the network by listening to the broadcast messages. This may be optionally reported 606, to the status central hub 403. After step 604, the bot (a) does work in step 608. The execution of the work by bot (a) may be optionally reported 610 to the status central hub 403. After bot (a) has finished doing its work, the software robot (a) is then removed from the pool or the multiple software robots of the robotic process automation organization network 202. This is accomplished by first, 614, receiving the signal of removing the bot from the pool. This may be optionally reported, 616, to the status central hub 403. After step 614, step 618 is performed. In step 618 the removed software robot stops responding to the network broadcasting. In step 620 the software robot (a) finishes the work already scheduled to be executed. Next, in step 622, the software bot (a) stops running. This may be optionally reported, 624, to the status central hub 403 (also shown in FIG. 4). The method is then finally over in step 626 where it stops.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of operating a robotic process automation organization network comprising multiple software robots, the method comprising:
   receiving a task by a main robot via the network, wherein the main robot is one of the multiple software robots, wherein the task comprises a code package comprising instructions for execution by the main robot;
   broadcasting a multicast request for services by the main robot to multiple software robots, each robot is implemented as a computer program on individual computer systems of multiple computer systems via the network;
   in response to the broadcasting, receiving a response by at least a portion of the multiple software robots via the network;
   selecting at least one worker robot from the at least a portion of the multiple robots by the main robot; and
   distributing at least a portion of the code package to the at least one worker robot by the main robot via the network for execution of the at least a portion of the code package by the at least one worker robot.

2. The computer implemented method of claim 1, wherein the code package comprises parallel execution instructions, wherein the selection of the at least one worker robot is a selection of multiple of the worker robots, wherein the method further comprises:
   distributing the code package to execute the parallel execution instructions to more than one of the multiple worker robots by the main robot via the network;
   receiving computer results from the more than one of the multiple worker robots by the main robot via the network in response to distributing the code package; and
   merging the computer results of the more than one of the multiple worker robots by the main robot to complete execution of the parallel execution instructions.

3. The computer implemented method of claim 1, wherein each of the multiple software robots has at least one pre-programmed role to perform within the robotic process automation organization network.

4. The computer implemented method of claim 3, wherein the at least one preprogrammed role comprises a package distribution role.

5. The computer implemented method of claim 3, wherein the at least one preprogrammed role comprises a package execution role.

6. The computer implemented method of claim 3, wherein the at least one preprogrammed role comprises a queue holder role.

7. The computer implemented method of claim 3, wherein the at least one preprogrammed role comprises a queue backup holder role.

8. The computer implemented method of claim 3, wherein the at least one preprogrammed role comprises a worker role.

9. The computer implemented method of claim 1, wherein the method comprises adding an additional robot to the multiple software robots by:
   connecting an additional computer system to the network;
   instantiating the additional robot on the additional computer system; and
   joining the additional robot to the multiple software robots by having the additional robot monitor the network for the multicast request.

10. The computer implemented method of claim 9, wherein the code package comprises a quality of service specification, wherein the method further comprises:
    determining a quality of service metric before or during distribution of the at least a portion of the code package or during execution of the at least a portion of the code package; and
    triggering the addition of the additional robot to the multiple software robots if the quality of service metric does not meet the quality of service specification.

11. The computer implemented method of claim 9, wherein the multiple software robots comprise a robot specific geographic location identifier, wherein the method further comprises:
    receiving a site failure warning via the network, wherein the site failure warning comprises a site geographic location identifier; and
    triggering the addition of the additional robot to the multiple software robots if the site geographic location identifier matches the robot specific geographic location identifier of a selected robot from the multiple software robots.

12. The computer implemented method of claim 1, wherein the multiple software robots comprise a robot specific environment tag which identifies the multiple software robots as operating in either a production environment, a test environment, and a development environment, wherein the method further comprises using the robot specific environment tag to operate the multiple software robots within the production environment, the test environment, and the development environment as a shared pool of software robots.

13. The computer implemented method of claim 1, wherein the method further comprises:
estimating an execution time for the at least a portion of the code package by the at least one worker robot by inputting the at least a portion of the code package into an execution time estimation module; and
scheduling additional monitoring of the network for further multicast requests by the at least one worker robot using the execution time.

14. The computer implemented method of 13, wherein one of the multiple software robots is configured as a performance monitor, wherein the method further comprises:
collecting performance data from the at least a portion of the multiple software robots during execution of the at least a portion of the code package by the performance monitor via the network; and
updating the execution time estimation module using the performance data.

15. The computer implemented method of claim 1, wherein the multiple software robots are divided into multiple groups, wherein each of the multiple groups is configured to perform at least one task which is associated with this group of software robots.

16. The computer implemented method of claim 1, wherein the multiple software robots are configured as a self-organizing system for automatically distributing and completing tasks comprising code packages.

17. A computer-readable storage medium having computer executable instructions that when executed by at least one computing device operate a robotic process automation organization network comprising multiple software robots, comprising instructions to:
receive a task by a main robot via the network, wherein the main robot is one of the multiple software robots, wherein the task comprises a code package comprising instructions for execution by the main robot;
broadcast a multicast request for services by the main robot to multiple software robots, each robot is implemented as a computer program on individual computer systems of multiple computer systems via the network;
in response to the broadcasting, receive a response by at least a portion of the multiple software robots via the network;
select at least one worker robot from the at least a portion of the multiple robots by the main robot; and
distribute at least a portion of the code package to the at least one worker robot by the main robot via the network for execution of the at least a portion of the code package by the at least one worker robot.

18. A computer system operating a robotic process automation organization network comprising multiple software robots comprising:
a processor configured for controlling said computer system; and
a memory coupled to the processor, said memory storing machine executable instructions and software robot executable instructions, execution of said instructions causes said processor to:
receive a task by a main robot via the network, wherein the main robot is one of the multiple software robots, wherein the task comprises a code package comprising instructions for execution by the main robot;
broadcast a multicast request for services by the main robot to multiple software robots, each robot is implemented as a computer program on individual computer systems of multiple computer systems via the network;
in response to the broadcasting, receive a response by at least a portion of the multiple software robots via the network;
select at least one worker robot from the at least a portion of the multiple robots by the main robot; and
distribute at least a portion of the code package to the at least one worker robot by the main robot via the network for execution of the at least a portion of the code package by the at least one worker robot.

19. The computer system of claim 18, wherein execution of said instructions further causes said processor to:
instantiate a software robot by executing the software robot executable instructions;
log the software robot onto the computer system by providing a user identification and a password; and
join the software robot to a robotic process automation organization network by providing access to a network.

20. The computer system of claim 19, wherein execution of said instructions further causes said processor to:
receive a multicast request for services from a main robot of the robotic process automation organization network via the network by the software robot;
send a response to multicast request to the main robot via the network requesting to perform the services;
receive a portion of a code package from the main robot via the network; and
execute the at least a portion of the code package by the software robot.

* * * * *